United States Patent [19]
Bartol et al.

[11] Patent Number: 5,642,033
[45] Date of Patent: Jun. 24, 1997

[54] OVERLOAD-PROTECTED AND REFERENCE-VOLTAGE-LOSS-PROTECTED ELECTRONIC VOLTAGE REGULATOR FOR VEHICULAR-TYPE ALTERNATORS THAT BOTH TOLERATES MOMENTARY HIGH FIELD CURRENTS AND SUPPRESSES LOW FREQUENCY NOISE

[76] Inventors: Luis E. Bartol; German Holguin, both of c/o Industrias Condor, S.A. de C.V. Blvd M. Cervantes Saavedra no. 17, Col Granada 11520, Mexico

[21] Appl. No.: 580,763

[22] Filed: Dec. 29, 1995

[51] Int. Cl.$^6$ .................................. H02H 7/06
[52] U.S. Cl. ............................... 322/25; 322/28
[58] Field of Search ..................... 322/25, 26, 27, 322/28

[56] References Cited

U.S. PATENT DOCUMENTS

| | | | |
|---|---|---|---|
| 4,129,819 | 12/1978 | Arendt | 322/28 |
| 4,280,087 | 7/1981 | Kasiewicz | 322/28 |
| 4,658,200 | 4/1987 | Kouge | 322/25 |
| 4,733,159 | 3/1988 | Edwards et al. | 323/282 |
| 5,245,271 | 9/1993 | Simmons | 322/60 |
| 5,325,044 | 6/1994 | Bartol | 322/25 |

Primary Examiner—Steven L. Stephan
Assistant Examiner—Nicholas Ponomarenko
Attorney, Agent, or Firm—William C. Fuess

[57] ABSTRACT

An error amplifier feedback capacitor located between the signal output and the signal input of an error amplifier stage of a voltage regulator is removed, particularly preventing that charge stored on this capacitor should act through an overload protection circuit of a voltage regulator so protected so as to undesirably turn off the output driver (as if there was an overload) in an oscillatory manner, undesirably causing a "pulsing" or "hunting" upon the occasion(s) of high alternator field drive currents. Meanwhile, a new capacitor that is located across a leg of the input voltage divider stage of the voltage regulator and that is called a voltage divider capacitor, is substituted. The combined effect of the (i) removal and (ii) substitution substantially eliminates "ghosts", or such low frequency noise as is commonly called "commutator noise", in any voltage regulator, including those that are optionally protected against failure due to overload. Still furthermore, and separately and severally, a small resistance is introduced into a direct current discharge path present in certain voltage regulators protected against short circuits. This added resistance, in combination with the regulation feedback capacitor, introduces a small time delay to the initiation of shutdown in the event of a detected short circuit condition, thus helping prevent that normal noise, especially at high alternator field drive currents, should undesirably trigger short circuit shutdown of the voltage regulator.

11 Claims, 11 Drawing Sheets

OVERLOAD-PROTECTED AND REFERENCE-VOLTAGE-LOSS-PROTECTED ELECTRONIC VOLTAGE REGULATOR FOR VEHICULAR-TYPE ALTERNATORS THAT BOTH TOLERATES MOMENTARY HIGH FIELD CURRENTS AND SUPPRESSES LOW FREQUENCY NOISE

REFERENCE TO RELATED PATENTS AND PATENT APPLICATIONS

The present patent application concerns improvements to electronic voltage regulators in general, and in particular concerns improvements that are particularly useful of incorporation in the ELECTRONIC VOLTAGE REGULATOR PROTECTED AGAINST FAILURE DUE TO OVERLOAD, OR DUE TO LOSS OF A REFERENCE VOLTAGE that is taught in U.S. Pat. No. 5,325,044 issued Jun. 28, 1994, to the selfsame Luis Bartol who is a co-inventor in the present application.

The contents of the related patent are incorporated herein by reference.

BACKGROUND OF THE INVENTION

1. Field of the Invention

The present invention generally concerns electronic voltage regulators, such as those found in motor vehicles, that serve to regulate the current in the field winding of an alternator in accordance with the level of a direct current, battery, voltage that is maintained by the alternator. The present invention particularly concerns modifications to an electronic voltage regulator that is already improved so as to protect against (i) induced failure due to overload, and also, separately and additionally, (ii) induced failure due to loss of a reference voltage.

The present invention still more particularly concerns both (i) an improvement to a particular electronic voltage regulator overload-protection circuit of the prior art so as to permit a voltage regulator having this improvement circuit to reliably conduct the high field currents that are associated with high alternator current outputs, and, separately and severally, a (ii) an improvement to the noise figure of an electronic voltage regulator.

2. Description of the Prior Art

The present patent application concerns improvements to electronic voltage regulators in general, and in particular concerns improvements that are usefully incorporated in the ELECTRONIC VOLTAGE REGULATOR PROTECTED AGAINST FAILURE DUE TO OVERLOAD, OR DUE TO LOSS OF A REFERENCE VOLTAGE that is taught in U.S. Pat. No. 5,325,044 issued Jun. 28, 1994, to the selfsame Luis Bartol who is a co-inventor in the present application. The contents of the related patent are incorporated herein by reference.

In the prior patent an electronic voltage regulator, particularly a regulator serving to regulate the voltage of a field coil of an alternator within a motor vehicle, is protected against catastrophic failure of its output transistor due to a short-circuit overload by action of a direct current (d.c.) electrical path within the circuit of the regulator. This d.c. path, preferably a single diode, discharges an existing capacitor present within an alternating current (a.c.) feedback path between the regulator's output transistor and its error amplifier stage. This discharge causes the output transistor to break into a safe, and non-destructive, oscillation for the duration of any overload.

The same electronic voltage regulator is further, optionally, protected against a catastrophic failure of its output transistor due to a loss of the reference voltage supplied to the regulator. This protection is obtained by action of yet another, second, direct current (d.c.) electrical path. This second d.c. path, preferably a single resistor, serves, upon loss of a reference voltage to the voltage regulator, to couple voltage produced by the magnetic field within the field winding of the alternator back to the error amplifier stage of the regulator. This coupled voltage causes the error amplifier stage to, in turn, drive the regulator's output bipolar transistor to a condition where, by action of the first and the second paths, the bipolar transistor is safely maintained in an oscillatory condition until the reference voltage is restored.

The advanced operation of this voltage regulator protected both against failure (i) due to overload, and (ii) due to loss of a reference voltage, has been, and continues to be, proven successful both in the market and in real-world use since the 1991 filing of the related application. Quite simply, and as is explained in the related patent, a voltage regulator so protected will survive without harm two common external conditions that are causative of the catastrophic failure of any voltage regulator not so protected.

However, certain high-output configurations of the protected voltage regulator—such as are particularly used in heavy duty applications such as trucks—have shown to exhibit some sensitivity to "pulsing" or "hunting" upon the occasion(s) of high alternator field drive currents. This sensitivity is due to false activation of the overload protection circuitry. Essentially the overload-protected voltage regulator has difficulty discriminating between a total short circuit and the current that would flow in the alternator field winding upon the occasion of a very high alternator current of more than, typically, one hundred amperes (100 Amp.).

Additionally, the previous invention does nothing to improve the noise figure of the regulation. If the quality of the regulation can be improved in vehicular applications, and the vehicle primary power bus made to exhibit lower noise under diverse conditions and at frequencies ranging from conducted broadband to radio, then the cost of noise filtration in the electronic devices, such as radios and computers, that derive their primary power from the vehicle bus might be lessened.

Accordingly, and considering that the design of voltage regulators is still (circa 1995) an art as well as a science, various things that can be cost-effectively done to improve overall voltage regulation performance are worthy of evaluation, and are potentially desirable.

SUMMARY OF THE INVENTION

The present invention first contemplates improving an existing overload-protection circuit of an existing electronic voltage regulator by removing a feedback capacitor—called an "error amplifier feedback capacitor"—that is commonly located between the signal output and the signal input of an error amplifier stage of the voltage regulator.

Although distinctly not limited to voltage regulators that are protected from overload by virtue of incorporating a d.c. discharge path leading to another capacitor—called a "regulation feedback capacitor"—that is located within an a.c. feedback path between an output driver stage of the voltage regulator and the error amplifier stage, the removal of the error amplifier feedback capacitor is particularly efficacious in a voltage regulator so protected. Namely, the removal of the error amplifier capacitor serves to prevent that the charge stored on this capacitor should act through the overload protection circuit in order to undesirably turn off the output driver (as if there was an overload) in an oscillatory manner, undesirably causing a "pulsing" or "hunting" upon the occasion(s) of high alternator field drive currents.

Meanwhile, and at the same time, the present invention second contemplates substituting a new capacitor, located across a leg of the input voltage divider stage of the voltage regulator and called a "voltage divider capacitor", for the error amplifier feedback capacitor that was just removed from the error amplifier stage of the regulator. The combined effect of the (i) removal and (ii) substitution is to markedly improve voltage regulation by substantially eliminating "ghosts", or such low frequency noise as is commonly called "commutator noise", in a voltage regulator that may from time to time produce high alternator field drive currents. This noise improvement will occur nonetheless that, optionally, the voltage regulator is also fully protected against overload.

In simplest terms, and when applied as is preferable to a voltage regulator that is protected against overload, both (i) the immunity of the overload-protected voltage regulator to a false triggering of its overload protection circuit in the normal event of a high alternator field drive current, and (ii) the noise of the voltage regulation in the voltage regulator, are improved. This improvement arises by moving the location of a capacitor.

Meanwhile, the present invention still further, separately and severally, contemplates introducing a small resistance in a direct current discharge path—which direct current discharge path is present in voltage regulators protected against short circuits in accordance with the teaching of U.S. Pat. No. 5,325,044—to the regulation feedback capacitor of an electronic voltage regulator. This added resistance, in combination with the regulation feedback capacitor, introduces a small time delay to the initiation of shutdown in the event of a detected short circuit condition, thus helping prevent that normal noise, especially at high alternator field drive currents, should trigger a short circuit shutdown of the voltage regulator.

In simplest terms, a voltage regulator—which is preferably (but not necessarily) already improved in its immunity to a false triggering of its overload protection circuitry by application of the first aspect of the present invention (where a capacitor is moved)—is desirably still further improved by the further addition of a new resistor. The summary effect of both changes is to substantially immunize a voltage regulator so protected against any false over-current protection shutdown due to momentary high current drive into the field coil of an alternator nonetheless that the voltage regulator remains fully protected against a true short circuit in the same current drive.

1. A First Way of Regarding the First Aspect of the Present Invention: A Filter Capacitor is Located in the Diode-Isolated Voltage Divider Stage of a Voltage Regulator that Simultaneously Is Without Any Error Amplifier Stage Feedback Capacitor In the first of the two separate and severable aspects of the present invention, a modification is made to an existing electronic voltage regulator. The modification is directed to the end of preventing any "pulsing", or "hunting", of the regulated alternator output current at high field currents, typically greater than five amperes (5 Amp.), and at commensurately high alternator currents, typically greater than one hundred amperes (100 A).

There are two different ways to regard this modification. The first is to consider that it is applicable to any voltage regulator that has—as has always the case with all voltage regulators to the best knowledge of the inventors—an "error amplifier feedback capacitor", being a simple capacitor that is located in, and that establishes, an a.c. feedback path between the output and the input of the error amplifier stage of the voltage regulator. It is by this standard feedback path, and the "error amplifier feedback capacitor", that the response time of the error amplifier—which is a fundamental and necessary constituent of all voltage regulators—is improved.

The first aspect of the present invention may thus first be characterized as a modification to any electronic voltage regulator that is connected across the voltage terminals of a battery in order to produce a pulse-width-modulated signal across the field winding of an alternator that is also connected across the voltage terminals of the battery. Such a voltage regulator includes a diode-isolated voltage divider—connected across the terminals of the battery—that produces a diode-isolated error voltage that varies in response to variations in a voltage across the terminals of the battery.

In accordance with the first aspect of the present invention this diode-isolated voltage divider is distinguished for including a filter that serves to filter electrical noise occurring between the voltage terminals of the battery. The preferred filter includes (i) a first resistor, (ii) a diode, preferably a zener diode, connected in electrical series with the first resistor, (iii) a capacitor connected in electrical parallel with the electrically-series-connected first resistor and diode, jointly, and (iv) a second resistor connected in electrical series with the collective electrically-series-connected first resistor and diode (that are jointly electrically-parallel-connected with the capacitor).

In this configuration the error voltage is developed at the junction of the first resistor and the diode. A voltage divider is thus realized from, as a first leg of the voltage divider, the first resistor and, as a second leg of the voltage divider, the diode and the second resistor. In this configuration the capacitor acts as the filter means to filter electrical noise between the terminals of the battery.

An error amplifier—connected across the terminals of the battery—produces an output control signal in response to the diode-isolated error voltage received as an input signal from the voltage divider. In accordance with the present invention this error amplifier is distinguished for lacking any a.c feedback path whatsoever from the produced output control signal to the input error voltage signal.

Finally, a driver—also connected across the terminals of the battery—produces the pulse-width-modulated signal in response to the control signal received from the error amplifier means via a direct current path.

In this first way of looking at the first aspect of the present invention, it may be considered that the normal function of the absent feedback path between the output control signal and the input error voltage signal of the error amplifier to stabilize the error amplifier, and thus also the final pulse-width-modulated signal output of the voltage regulator, is now instead performed by the new filter of the diode-isolated voltage divider.

2. A Second Way of Regarding the First Aspect of the Present Invention: Prevention of "Pulsing" or "Hunting" While Tolerating Momentary High Field Currents, Especially In a Highly Loaded Electronic Voltage Regulator that is Already Protected Against Overload There is an alternative, second, way of regarding the first of the two separate and severable aspects of the present invention. In this case it may be considered that the modification is made to a particular type of voltage regulator that already has and incorporates overload protection.

The first aspect of the present invention may thus alternatively, secondly, be characterized as a modification to an electronic voltage regulator that is connected across the voltage terminals of a battery and that produces a pulse-width-modulated signal across the field winding of an alternator that is also connected across the voltage terminals of the battery.

Such a voltage regulator includes a diode-isolated voltage divider—connected across the terminals of the battery—that produces a diode-isolated error voltage that varies in response to variations in a voltage across the terminals of the battery.

In accordance with the invention, this diode-isolated voltage divider is distinguished for including a filter that serves to filter electrical noise occurring between the voltage terminals of the battery. The preferred filter is constructed as just explained in the previous section 1.

An error amplifier—also connected across the terminals of the battery—produces an output control signal in response to the diode-isolated error voltage received as an input signal from the diode-isolated voltage divider.

A driver—also connected across the terminals of the battery—produces the pulse-width-modulated signal in response to the control signal received from the error amplifier via a direct current path.

Finally, an a.c. feedback path feeds back the pulse-width-modulated signal from the driver to the error amplifier.

3. Howsoever Alternatively Characterized, The First Aspect of the Present Invention Accords Improved Suppression of Low Frequency Noise in an Electronic Voltage Regulator All existing electronic voltage regulators known to the inventors incorporate a feedback capacitor from the output to the input of the error amplifier stage. Particularly (but not exclusively) for reasons of the involvement of this capacitor with the useful overload protection circuit of U.S. Pat. No. 5,325,044 that also feeds back to the input of the error amplifier stage—this time from the output of the driver stage—this capacitor is usefully eliminated, at least in its present position.

The capacitor is instead desirably moved into a certain previous, diode-isolated voltage divider, stage of the voltage regulator. It is at, and by, this stage that the ultimate, regulated, battery voltage is detected and divided into that very error signal that is received at, and used by, the error amplifier, and thus the entire voltage regulator. In this its new location the capacitor has a remarkably salubrious effect, and serves to promote superb regulation while greatly reducing low-frequency noise commonly called commutator noise.

The improved noise figure of the regulated battery voltage rebounds, in particular, to the benefit of the economies of construction of all the power supplies of the electronic appliances, such as radios and telephones and computer processor chips and the like, that are forever hooked to the battery power bus.

4. A Second Aspect of the Present Invention; Introduction of Time Delay to the Shutdown of an Overload-Protected Voltage Regulator As previously explained, the present invention further contemplates—separately and severally from its first aspect—the introduction of a small resistance in a particular direct current discharge path—which direct current discharge path is present in voltage regulators protected against short circuits in accordance with the teaching of U.S. Pat. No. 5,325,044—to a regulation feedback capacitor of an electronic voltage regulator. This added resistance, in combination with the feedback capacitor, introduces a small time delay to the initiation of shutdown in the event of a detected short circuit condition. This helps to prevent that normal noise, especially noise occurring at high alternator field drive currents, should undesirably trigger an erroneous short circuit shutdown of the voltage regulator.

In particular, an existing common voltage regulator has an error amplifier stage—possessed of both a signal input port and a signal output port—that conducts selectively in response to variations in the voltage of the battery so as to produce a control signal. This error amplifier stage is connected by a direct current path from its signal output port to an output driver. This output driver is responsive to the control signal for selectively conducting so as to produce at its output port a pulse-width-modulated signal.

In accordance with the teaching of U.S. Pat. No. 5,325,044, overload protection for this common voltage regulator is implemented by adding a diode that serves to conduct direct current from (i) the capacitor otherwise existing in a feedback path proceeding from the output port of the output driver means to (ii) the signal input port of the error amplifier means. In order that this capacitor may be discharged when the output driver is conducting, the diode connects the capacitor to one of the voltage terminals of the battery. The d.c. path through the diode acts—upon the times of any and all untoward occurrences when the output driver is attempting to drive the pulse-width-modulated signal into any such abnormally low impedance as causes the current in the output driver to rise precipitously, and to be fed back through the capacitor—to timely discharge this capacitor sufficiently fast (in comparison to a response time of the error amplifier) so as to drive the output driver to a non-conducting state before it sustains damage.

In accordance with the second aspect of the present invention, an improvement is made to this existing diode discharge circuit of the overload-protected voltage regulator. This improvement is directed to permitting the output driver to, incipiently and momentarily upon beginning conduction, conduct high current of such an amount, and at such rapidity, from both the battery and the capacitor, jointly, as would effectively become momentarily indistinguishable from an overload current. Namely, the incipient current is permitted to momentarily exceed that overload current that would be conducted should the field winding at the output port of the driver means exhibit such an abnormally low impedance as would, by action of the capacitor means, cause the output driver means to be driven non-conducting.

When the diode discharge circuit is so improved (in order to permit the momentary conduction of high current from the driver), then, it will include (i) the existing diode connecting the capacitor to one of the voltage terminals of the battery in a sense that provides a direct current path for discharging the capacitor means when the output transistor means is conducting, in combination with (ii) a new resistance in electrical series with the diode.

These and other aspects and attributes of the present invention will become increasingly clear upon reference to the following drawings and accompanying specification.

DESCRIPTION OF THE PREFERRED EMBODIMENT

Figure 1:
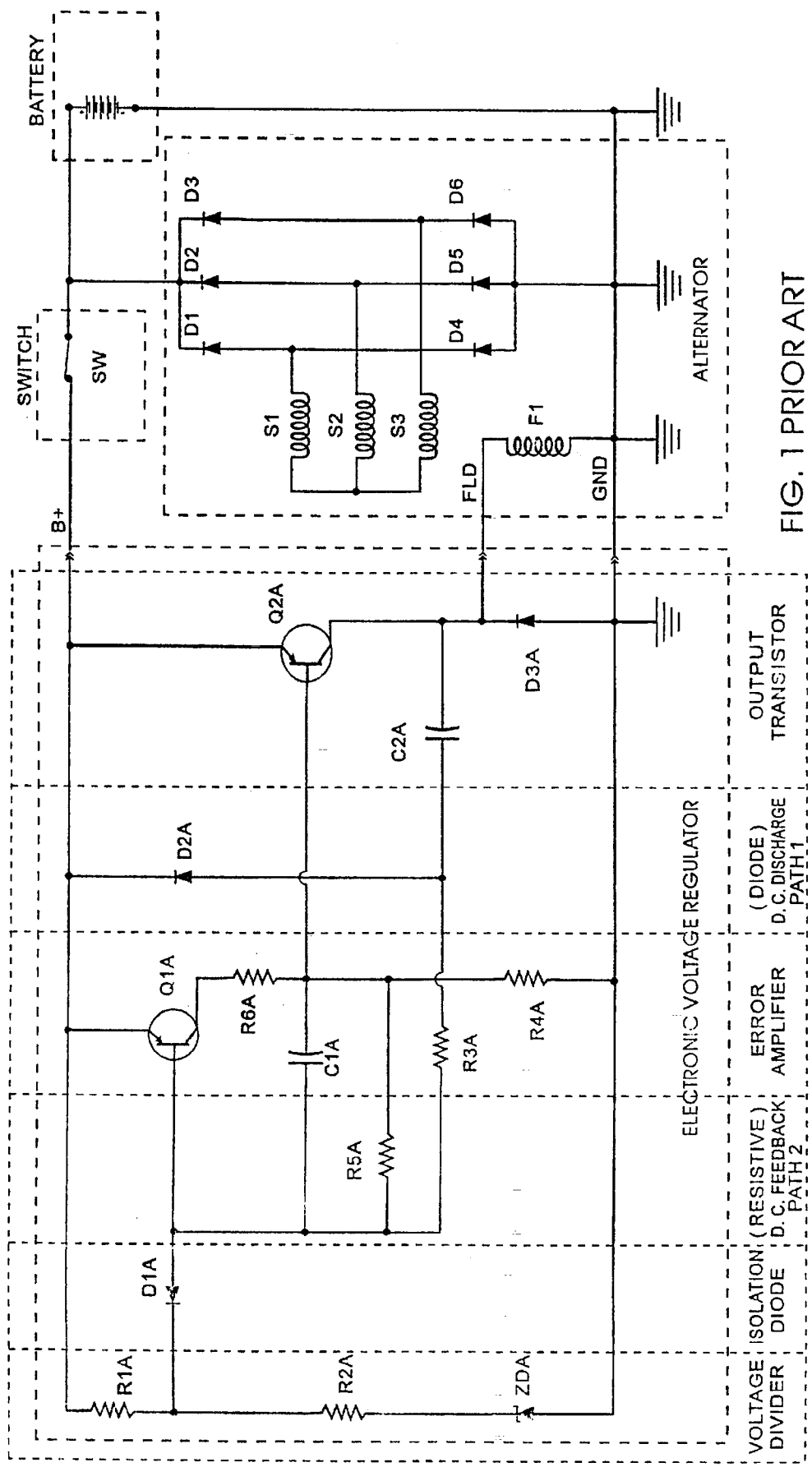
FIG. 1 is an electrical schematic diagram of a prior art first embodiment, based on PNP transistors, of an electronic voltage regulator in accordance with U.S. Pat. No. 5,325,044 incorporating a (diode) D.C. Discharge path for protection against catastrophic failure due to overload, and also a (resistive) D.C. Feedback path for protection against catastrophic failure due to loss of a reference ground.

An embodiment of a prior art ELECTRONIC VOLTAGE REGULATOR in accordance with related U.S., Pat. No. 5,325,044 is shown in schematic diagram FIG. 1. The embodiment is also capable of being implemented in complementary form based on NPN instead of PNP transistors.

The particular prior art ELECTRONIC VOLTAGE REGULATOR illustrated is notable in for the two direct current paths, and associated components, that are isolated in the drawings as the (i) (DIODE) D.C. DISCHARGE PATH, and the (ii) (RESISTIVE) D.C. FEEDBACK PATH. The ELECTRONIC VOLTAGE REGULATOR of FIG. 1 would be completely functional (proper component values being established) without inclusion of either of these electrical paths: the (i) (DIODE) D.C. DISCHARGE PATH, or the (ii) (RESISTIVE) D.C. FEEDBACK PATH. Namely, in the PNP embodiment of FIG. 1 the (i) diode D2A, and the (ii) resistor RSA each serve to realize a direct current electrical path. The lack of these components and these paths will not effect the normal operation of the ELECTRONIC VOLTAGE REGULATOR.

The ELECTRONIC VOLTAGE REGULATOR is connected between a battery positive voltage B+ and a ground GND that is produced in part by an external BATTERY and in part by an ALTERNATOR. The ELECTRONIC VOLTAGE REGULATOR produces an output voltage FLD which is impressed across the field winding F1 of an ALTERNATOR. As the rotor (not shown) of the ALTERNATOR turns under mechanical force an alternating current is induced in its stator coils S1–S3.

The ELECTRONIC VOLTAGE REGULATOR shown in FIG. 1 is particularly for use with alternators employed in vehicular applications. The REGULATOR applies a pulse-width-modulated voltage signal to the field winding F1 of the ALTERNATOR to maintain a constant voltage output at "B+" independently (within certain limits) of the load and the rotational speed of the ALTERNATOR.

The PNP embodiment of the ELECTRONIC VOLTAGE REGULATOR shown in FIG. 1 operates as follows. With switch SW closed (as it normally is during operation), then a VOLTAGE DIVIDER network made up with resistors R1A, R2A and Zener Diode ZDA, produces a voltage drop across R1A. Variations in this voltage drop are coupled by the anode-cathode (A–K) of ISOLATION DIODE D1A to be applied across the series combination base-emitter (B–E) junction of Q1A. Transistor Q1A and its associated biasing circuitry constitute the ERROR AMPLIFIER.

If the voltage drop across R1A is smaller than the added barrier voltages of (B–E)$_{Q1A}$ and (A–K)$_{D1A}$, then Q1A is OFF, and consequently Q2A will be fully ON (meaning saturated) because of emitter-base current of Q2A flowing through resistor R4A. Battery current will then flow in the alternator field winding F1. At this point, capacitor C2A will be discharged through D2A and the emitter-collector (E–C) junction of Q2A.

With the ALTERNATOR rotating (through mechanical coupling to the vehicle's engine), an alternating voltage is developed in the alternator's stator windings S1–S3. After rectification of this alternating voltage by the diodes D1–D6 making a full wave 3-phase rectifier bridge, this rectified voltage appears across the BATTERY as the regulated, "bus", voltage "B+".

If the existing conditions in the electrical system are such that the generated DC voltage applied to "B+" keeps rising, a cut—off point will be reached when the voltage drop across R1A allows sufficient conduction in Q1A so as to start turning Q2A OFF—usually at 14 volts for the component values listed hereinafter. (An ELECTRONIC VOLTAGE REGULATOR may also be configured, for example, to operate at 24 nominal volts.) From this point on, Q2A turns off rapidly due to the positive a.c. feedback through the path consisting of R3A and C2A. The field current is suddenly interrupted and diode D3A provides a discharge path for the accumulated field energy. At this point, capacitor C2A is charged to approximately V$_{B+}$.

As the previous condition persists, V$_{B+}$ starts decreasing. Eventually VR1A will be insufficient to keep Q1A turned firmly ON and, thus, Q2A turned firmly OFF. From this point on, Q2A turns ON rapidly, producing a residual voltage across C2A that is the sum of the voltage drops across the anode-cathode of D2A and the collector-emitter junction of Q2A. When Q2A finally turns fully ON, the external field winding current is restored and the regulation cycle is repeated indefinitely.

If due to any reason, i.e., a partial or a dead short across the alternator field winding, the current through Q2A should rise abruptly, then Q2A will start towards self-destruction. The rate of current rise will be limited only by the distributed inductance associated with the collector-emitter circuit of Q2A. The current rise will produce an increasing voltage drop across the collector-emitter junction of Q2A. This increasing voltage drop is coupled to the base-emitter junction of Q1A through the feedback network consisting of R3A and C2A. If the collector-emitter voltage drop rises sufficiently fast and is of large enough amplitude, then Q1A will be turned ON since C2A will always start the Q2A ON-cycle discharged and the fast-rising voltage wavefront across collector-emitter of Q2A will produce a firing pulse in Q1A within a few microseconds after the fast rising wavefront appears.

The positive feedback network of R3A and C2A will latch the ON-state of Q1A, consequently turning Q2A OFF. Diode D1A steers the current resulting from the collector-emitter voltage drop of Q2A into the base-emitter junction of Q1A and the feedback network of R3A and C2A. Accordingly, the charge in C2A is solely the result of the collector-emitter voltage drop in Q2A. By judicious selection of the parametric values of R3A, C2A, Q1A and Q2A, the duty cycle of Q2A under overload conditions can be made sufficiently small so as to indefinitely withstand without damage the overload condition over the full operating temperature range of the ELECTRONIC VOLTAGE REGULATOR.

Capacitor C1A, connected across the base-collector junction of Q1A, serves to stabilize transistor Q1A, avoiding false firing of overload protection circuitry because of electrical noise present in the vehicle's electrical system.

The prior art ELECTRONIC VOLTAGE REGULATOR of FIG. 1 further incorporates an electronic reference-voltage-loss protection circuit (a ground loss in the circuit of FIG. 1). This circuit is specifically designed to avoid catastrophic failure in the output transistor of an ELECTRONIC VOLTAGE REGULATOR, particularly as it is used in vehicular applications. The protection circuit operates when the voltage across this output transistor rises to abnormally high levels resultant from the inductive discharge of an alternator field winding under steady state or intermittent reference-voltage-loss conditions. Also, this circuit prevents regulator runaway, a condition associated with the reference-voltage-loss condition. The protection circuit is specifically designed to avoid catastrophic failure in the output transistor of an ELECTRONIC VOLTAGE REGULATOR (particularly as used in vehicular applications), as well as avoiding electrical stresses to the vehicle's alternator, battery and associated loads when the voltage reference to the regulator is lost because of an abnormal open circuit condition.

In the embodiment of the reference-voltage-loss protection circuit shown in the PNP version of the ELECTRONIC VOLTAGE REGULATOR of FIG. 1, the electrical voltage reference (which is lost) is the battery negative, or ground GND. This reference voltage may become lost because of a broken, intermittent or otherwise inadequate electrical connection between the vehicle's wiring and the voltage regulator's terminals. Such an inadequate electrical connection causing an open circuit condition may typically be caused by corrosion, by mechanically parted cables or connectors, or by inadvertent or intentional human intervention.

The reference-voltage-loss protection circuit senses the voltage-reference-loss because of a high voltage pulse that is developed by the field coil F1 (shown in FIG. 1) of the alternator upon loss of the reference voltage to the regulator. For example, loss of the reference ground GND to the ELECTRONIC VOLTAGE REGULATOR will leave a magnetic field in the field coil. The loss of the reference voltage to the ELECTRONIC VOLTAGE REGULATOR makes this field reverse polarity relative to the ELECTRONIC VOLTAGE REGULATOR. (In the electronic circuit schematic convention where a "dot" next to one end of a coil indicates polarity, the loss of the reference voltage is as if the "dot" changes ends on the coil F1.) This causes a high voltage pulse to the ELECTRONIC VOLTAGE REGULATOR.

This high voltage pulse inherently appears across the collector-emitter junction of the OUTPUT TRANSISTOR Q2A. The circuit discriminates this pulse and uses it for starting self-oscillations in the regulator's control circuit. These self-oscillations result in a low duty factor in the OUTPUT TRANSISTOR, causing very little excitation current to flow into the ALTERNATOR's field and preventing the ALTERNATOR runaway condition normally associated with reference voltage loss.

In the embodiment of this prior art reference-voltage-loss protection circuit shown in FIG. 1, when the reference lead (the ground, or GND) is accidentally disconnected through a corroded, intermittent or broken connection, then the discharge path of flywheel diode D3A is suddenly opened. As a consequence, a high voltage pulse is applied across the collector-emitter junction of OUTPUT TRANSISTOR Q2A. The magnitude and energy content of this pulse depend on several factors; such as the instantaneous current flowing in the field at the time of reference-loss, the value of the field's inductance, the external and electrical load present in the vehicle's generating circuit, and the distributed impedance associated with the vehicle's wiring, etc.

If the voltage pulse developed from the loss of the voltage reference is of sufficient amplitude and contains sufficient energy, a catastrophic second breakdown condition will occur in OUTPUT TRANSISTOR Q2A. The impedance values of series-connected R6A and R4A self-clamp output transistor Q2A to a safe voltage value, draining considerable amounts of energy from the unclamped inductive pulse, thus radically lowering the probability of OUTPUT TRANSISTOR failure.

Once the energy of the inductive pulse is safely dissipated, resistor R5A connected in a positive feedback configuration between Q1A and Q2A will force the circuit to self-oscillate with a low duty cycle because of the high impedance value of field inductance and feedback resistor R5A. The precise manner by which resistor R5A so functions is as follows. The biasing of ERROR AMPLIFIER transistor Q1A that is realized by the direct current feedback path (shown in dotted line in FIG. 1) that proceeds through R5A will cause this error amplifier transistor Q1A to conduct. Accordingly, OUTPUT TRANSISTOR Q2A will, at least initially, be forced into non-conduction. Eventually, in time, the OUTPUT TRANSISTOR Q2A will recommence conduction. However, the continuing conduction of OUTPUT TRANSISTOR Q2A will then, by operation of the first (DIODE) D.C. DISCHARGE PATH, serve to trigger the self-oscillatory behavior.

Accordingly, the second, (RESISTIVE) D.C. FEEDBACK PATH of the prior art ELECTRONIC VOLTAGE REGULATOR shown in FIG. 1 invention is cooperatively operative with the first, (DIODE) D.C. DISCHARGE PATH. Accordingly, the output FLD of the ELECTRONIC VOLTAGE REGULATOR will not run away, possibly saving the ALTERNATOR and external loads on the battery circuit of the vehicle, as well as the ELECTRONIC VOLTAGE REGULATOR itself, from destruction.

Figure 2:
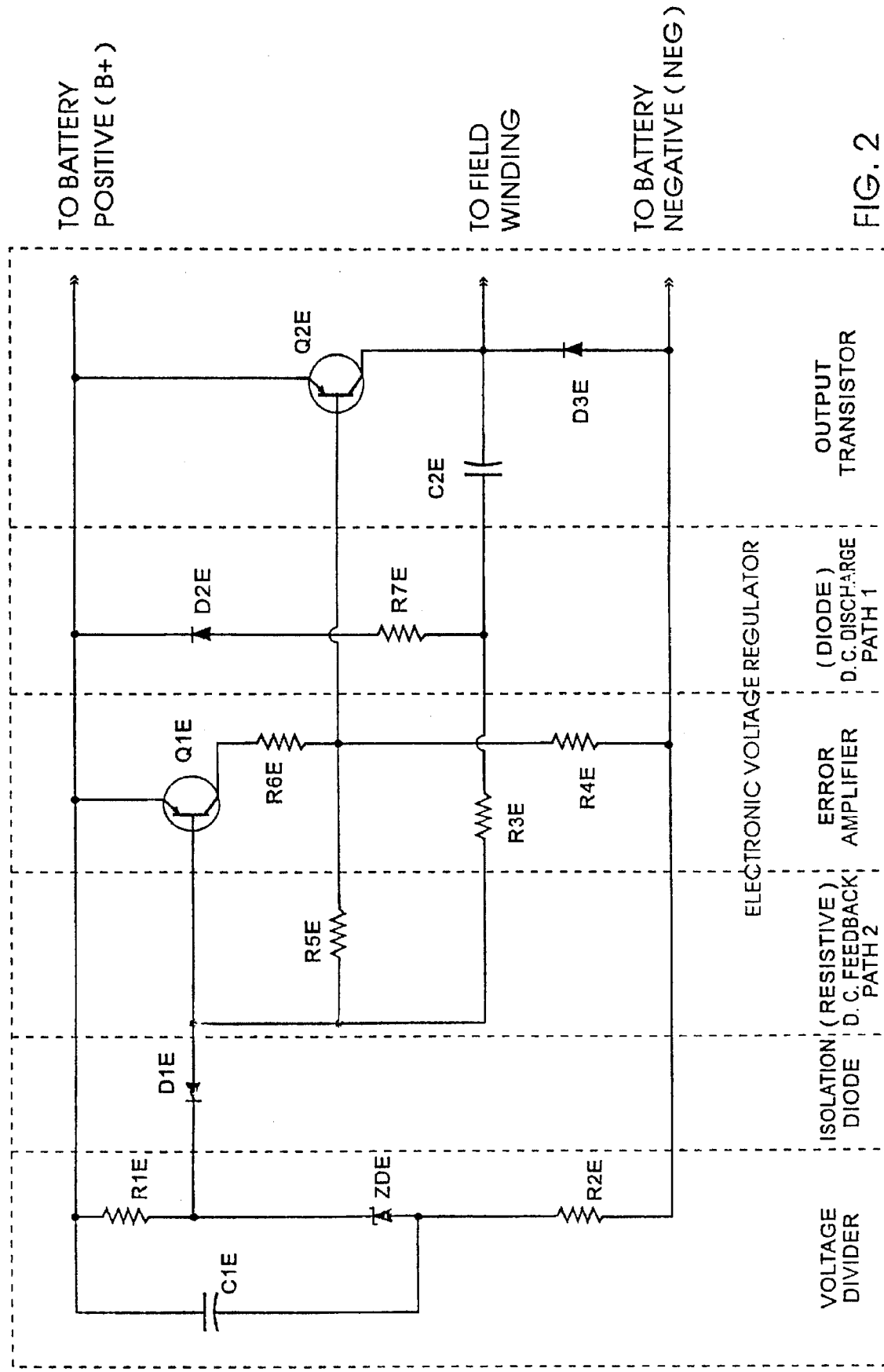
FIG. 2 is an electrical schematic diagram of a first embodiment, based on PNP transistors, of an electronic voltage regulator in accordance with the present invention wherein, by comparison with FIG. 1, (i) a new capacitor, located across a leg of the input voltage divider stage of the voltage regulator and called a voltage divider capacitor, is substituted for the error amplifier feedback capacitor, and (ii) a small resistance is added in the direct current discharge path to the regulation feedback capacitor.

Now consider the present invention. An electrical schematic diagram of a first embodiment, based on PNP transistors, of an electronic voltage regulator in accordance with the present invention is shown in FIG. 2. By comparison with FIG. 1 it may be noted that no counterpart to capacitor C1A (shown in FIG. 1) exists, and, instead and in substitution, a new capacitor C1E is located across a leg of the input voltage divider stage of the voltage regulator. In this location capacitor C1E is called a "voltage divider capacitor". The removal of the error amplifier capacitor C1A (shown in FIG. 1) serves to prevent that the charge stored on this capacitor should act through the overload protection feedback circuit in order to undesirably turn off the output driver (as if there was an overload) in an oscillatory manner, undesirably causing a "pulsing" or "hunting" upon the occasion(s) of high alternator field drive currents.

Meanwhile, the substitution of the new capacitor C1E, located across the leg of R1E and ZDE in the input voltage divider stage of the electronic voltage regulator, improves voltage regulation by substantially eliminating "ghosts", or such low frequency noise as is commonly called "commutator noise". This capacitor filtration of low frequency noise is especially useful in a voltage regulator that may from time to time produce high alternator field drive currents.

Continuing in FIG. 2, the small resistance R7E has been added in the direct current discharge path to the regulation feedback capacitor. This added resistance R7E, in combination with the regulation feedback capacitor C2E, introduces a small time delay—in accordance with the well-known response of a series resistive-capacitive (R—C) circuit—to the initiation of shutdown in the event of a detected short circuit condition. This helps to prevent that normal noise, especially noise occurring at high alternator field drive currents, should undesirably trigger an erroneous short circuit shutdown of the voltage regulator.

Figure 3:
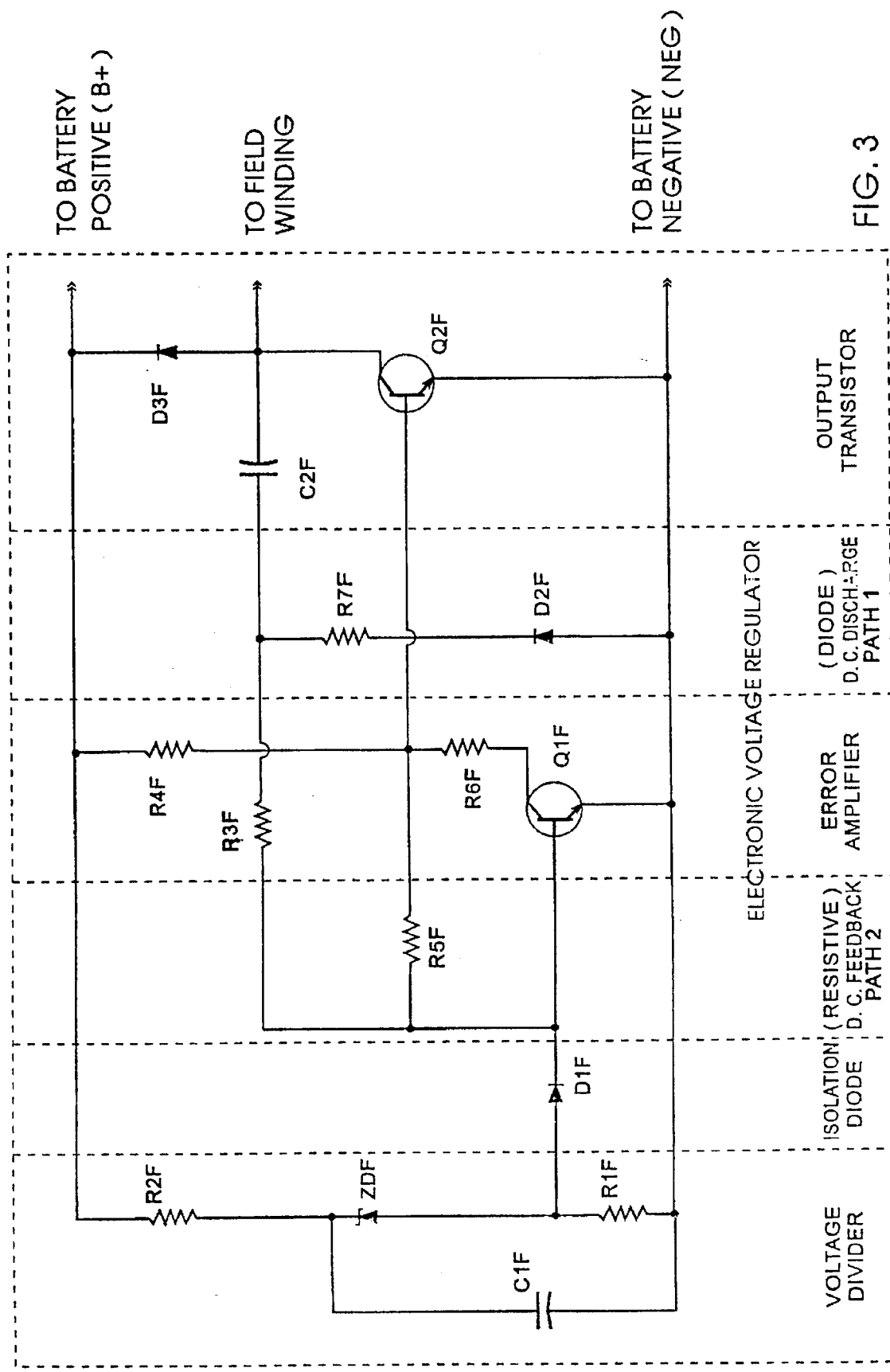
FIG. 3 is an electrical schematic diagram of a second embodiment, based on NPN transistors and complementary to the first embodiment shown in FIG. 2, of an electronic voltage regulator in accordance with the present invention.

An electrical schematic diagram of a second embodiment, based on NPN transistors and complementary to the first, PNP, embodiment shown in FIG. 2, of an electronic voltage regulator in accordance with the present invention is shown in FIG. 3.

Figure 4:
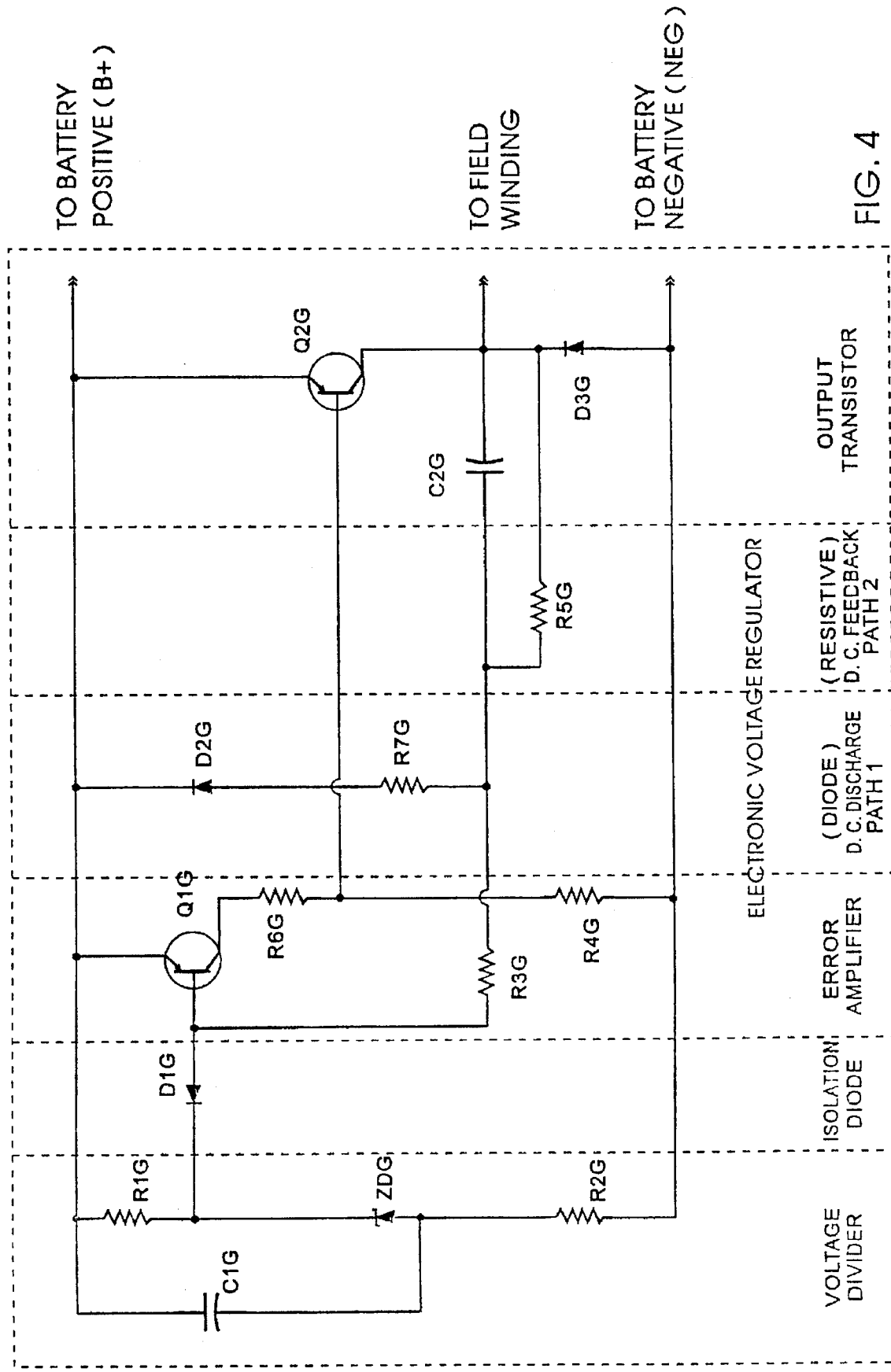
FIG. 4 is an electrical schematic diagram of a third embodiment, based on PNP transistors, of an electronic voltage regulator in accordance with the present invention.

An electrical schematic diagram of yet another, third, embodiment—based on PNP transistors—of an electronic voltage regulator in accordance with the present invention is shown in FIG. 4.

Figure 5:
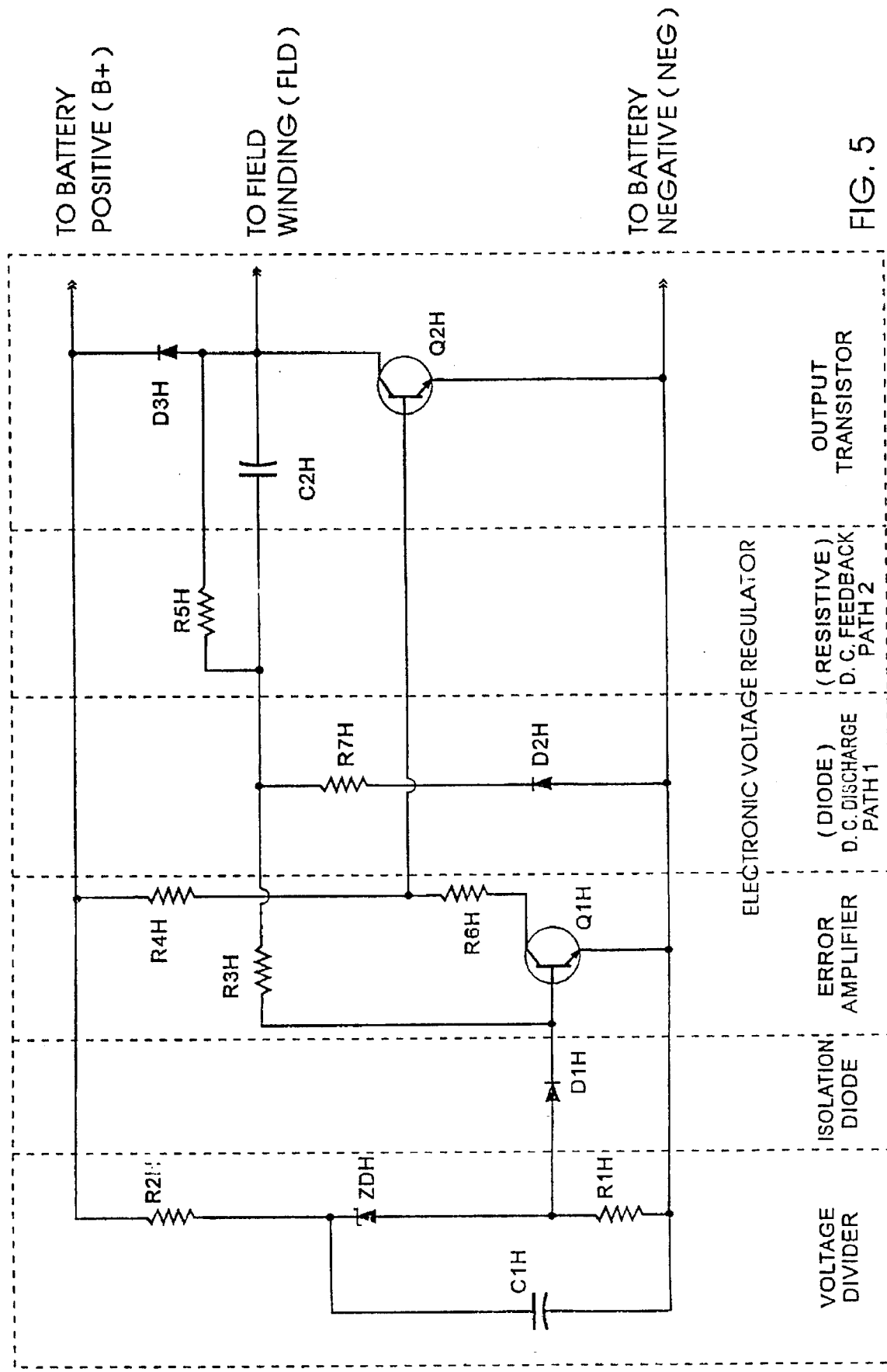
FIG. 5 is an electrical schematic diagram of a fourth embodiment, based on NPN transistors and complementary to the third embodiment shown in FIG. 4, of an electronic voltage regulator in accordance with the present invention.

Finally, an electrical schematic diagram of a still yet another, fourth, embodiment—based on NPN transistors and complementary to the third embodiment shown in FIG. 4—of an electronic voltage regulator in accordance with the present invention is shown in FIG. 5.

Figure 6:
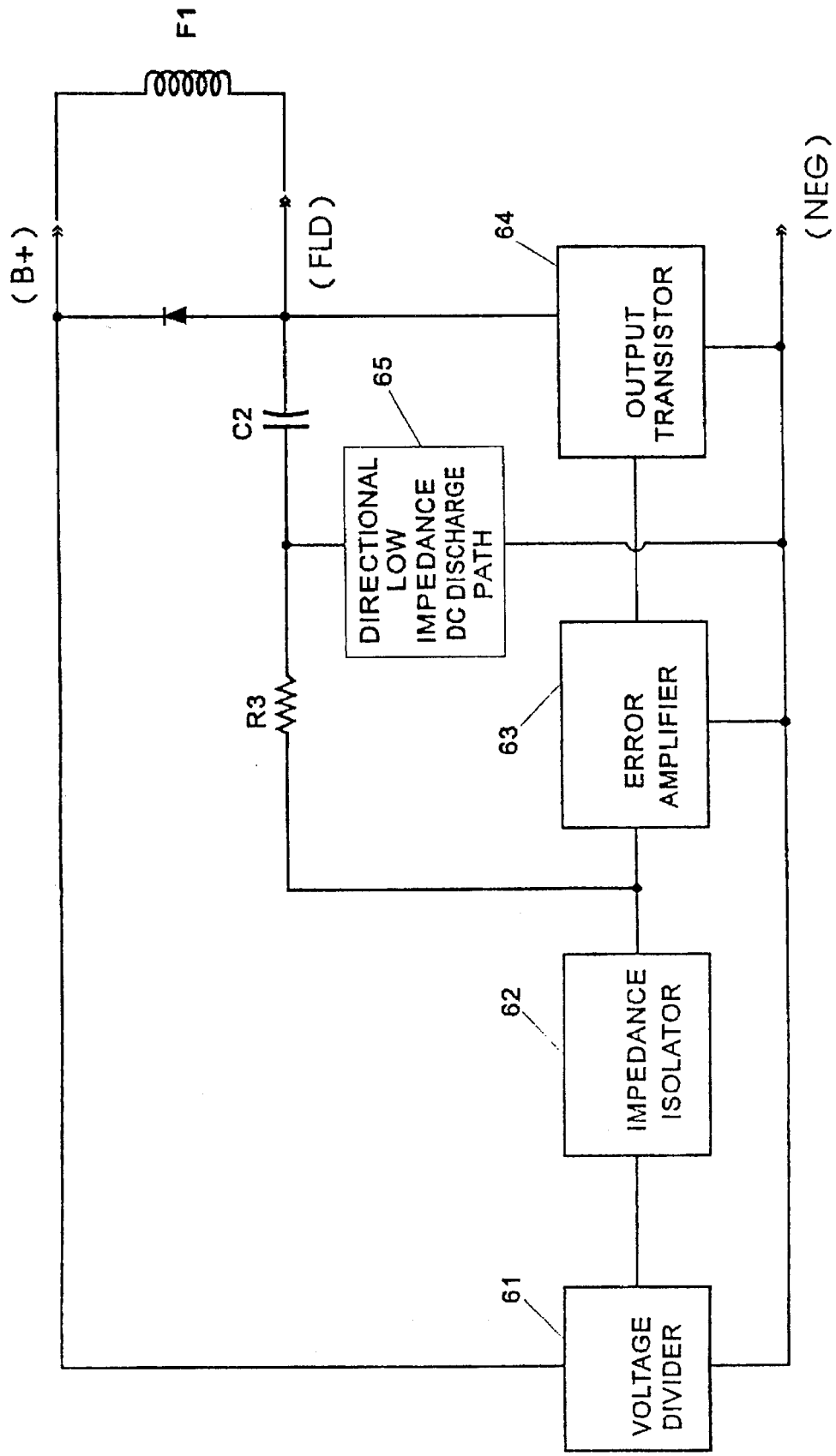
FIG. 6 is an electrical schematic block diagram of the second and fourth embodiments of the present invention based on NPN transistors.

An electrical schematic block diagram of the second and fourth embodiments of the present invention based on NPN transistors (as were previously shown in FIGS. 3 and 5) is shown in FIG. 6. All elements should be recognizable from the previous detail electrical circuit schematics. A VOLTAGE DIVIDER 61 is, as just explained, preferably filtered. A signal from the VOLTAGE DIVIDER 61 is passed though IMPEDANCE ISOLATOR 62 (a simple diode) to the ERROR AMPLIFIER 63. The amplified output signal from the ERROR AMPLIFIER 63 is used to control the switching of the OUTPUT TRANSISTOR 64, which in turn drives the field, or FLD, signal across the field winding F1 of an alternator (shown in FIG. 1). A feedback path proceeds from this driven, output signal FLD through diode C2 and resistor R3 back to (a wired-OR junction at the) input to the ERROR AMPLIFIER 63. A DIRECTIONAL, LOW IMPEDANCE, DC DISCHARGE PATH 65 serves to discharge feedback capacitor C2 in a manner that will prevent the OUTPUT TRANSISTOR 64 from destruction due to over-current in the event of an untoward shorting of field winding F1.

Figure 7:
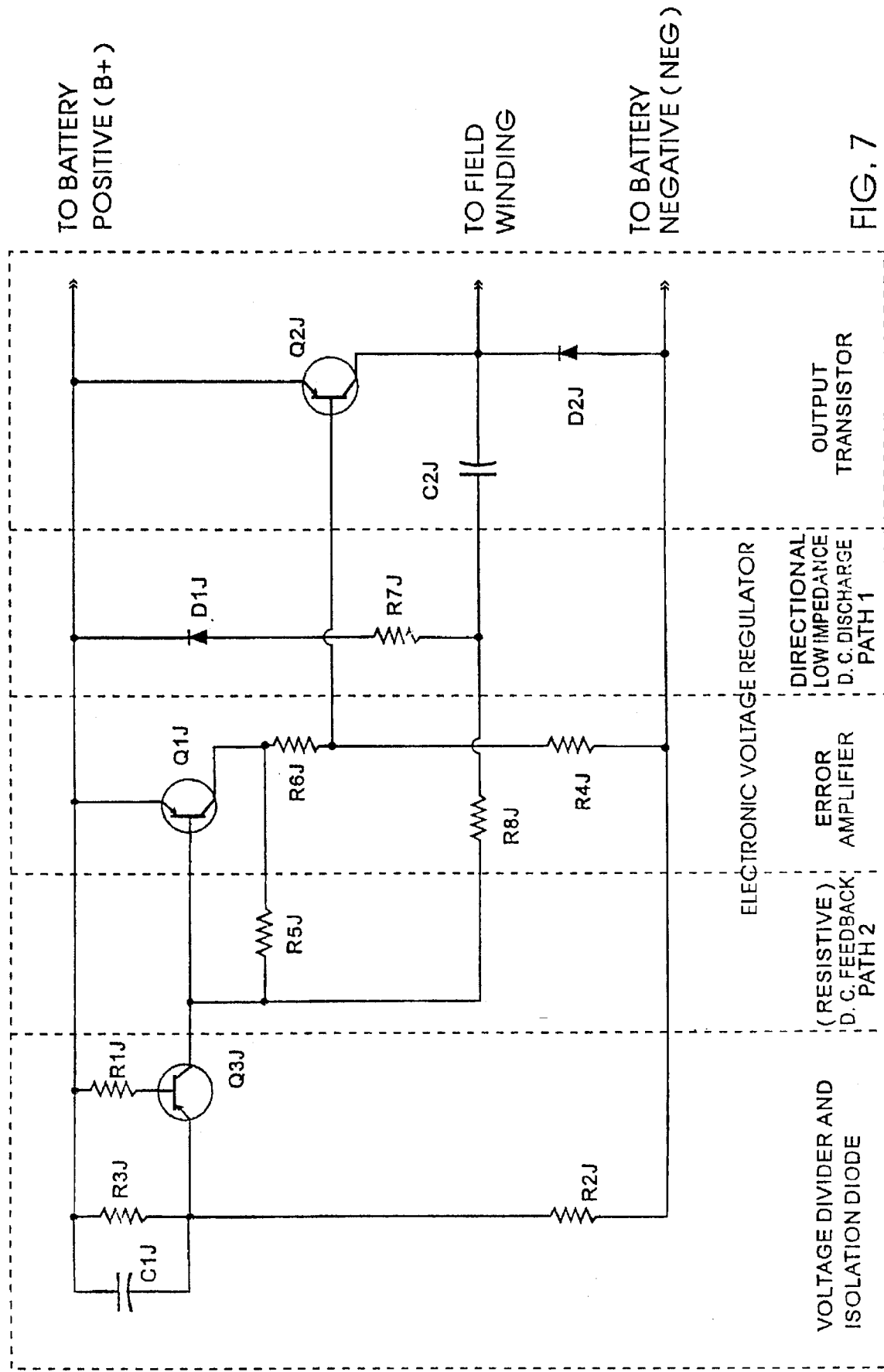
FIG. 7 is an electrical schematic diagram of a preferred fifth embodiment of the present invention, based on PNP transistors and analogous to the first embodiment shown in FIG. 2, of an electronic voltage regulator in accordance with the present invention wherein the regulator incorporates, as well as both the (i) new capacitor located across a leg of the input voltage divider stage of the voltage regulator, and also the (ii) small resistance added in the direct current discharge path to the regulation feedback capacitor, of the present invention, a (iii) (diode) D.C. Discharge path for protection against catastrophic failure due to overload, and also a (resistive) D.C. Feedback path for protection against catastrophic failure due to loss of a reference negative voltage.

An electrical schematic diagram of a preferred fifth embodiment of the present invention—based on PNP transistors and analogous to the first embodiment shown in FIG. 2—of an electronic voltage regulator in accordance with the present invention is shown in FIG. 7. This fifth embodiment of the electronic voltage regulator incorporates, as well as both the (i) new capacitor C1J located across a leg of the input voltage divider stage of the voltage regulator, and also the (ii) small resistance R7J added in the direct current discharge path to the regulation feedback capacitor, of the present invention, a (iii) (diode) D.C. Discharge path for protection against catastrophic failure due to overload, and also a (resistive) D.C. Feedback path for protection against catastrophic failure due to loss of a reference negative voltage. The operation of this circuit should be understandable from the explanation previously given as to the prior art circuit of FIG. 1, and, for example, the first embodiment circuit of the present invention shown in FIG. 2.

Figure 8:
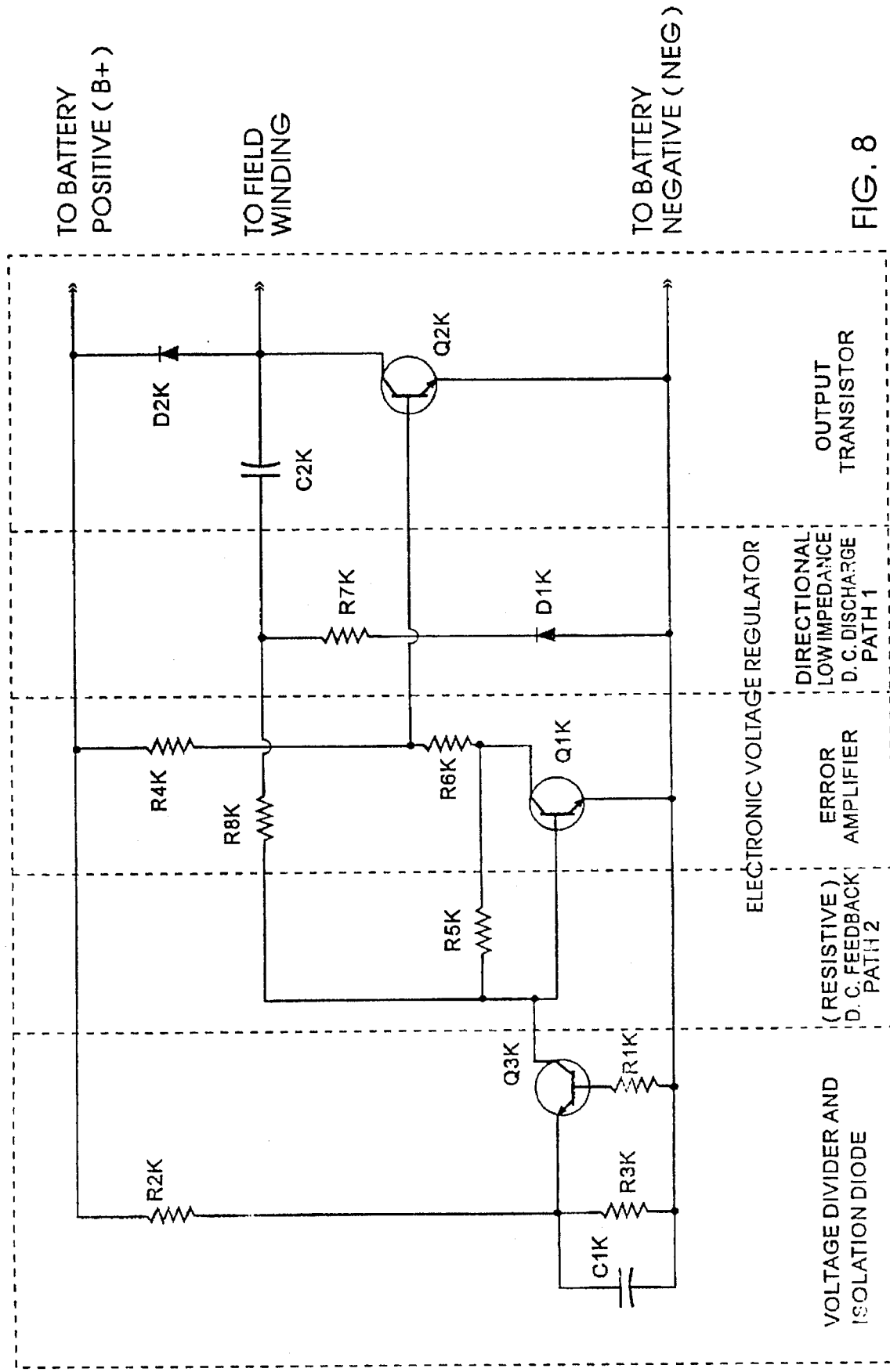
FIG. 8 is an electrical schematic diagram of a preferred sixth embodiment, based on NPN transistors and complementary to the fifth embodiment shown in FIG. 7, of an electronic voltage regulator in accordance with the present invention wherein the regulator incorporates, as well as both the (i) new capacitor located across a leg of the input voltage divider stage of the voltage regulator, and also the (ii) small resistance added in the direct current discharge path to the regulation feedback capacitor, of the present invention, a (iii) (diode) D.C. Discharge path for protection against catastrophic failure due to overload, and also a (resistive) D.C. Feedback path for protection against catastrophic failure due to loss of a reference positive voltage.

Likewise, and similarly, an electrical schematic diagram of a preferred sixth embodiment—based on NPN transistors and complementary to the fifth embodiment shown in FIG. 7—of an electronic voltage regulator in accordance with the present invention is shown in FIG. 8. This sixth embodiment of an electronic voltage regulator incorporates, as well as both the (i) new capacitor located C1K across a leg of the input voltage divider stage of the voltage regulator, and also the (ii) small resistance R7K added in the direct current discharge path to the regulation feedback capacitor, of the present invention, a (iii) (diode) D.C. Discharge path for protection against catastrophic failure due to overload, and also a (resistive) D.C. Feedback path for protection against catastrophic failure due to loss of a reference positive voltage.

Figure 9:
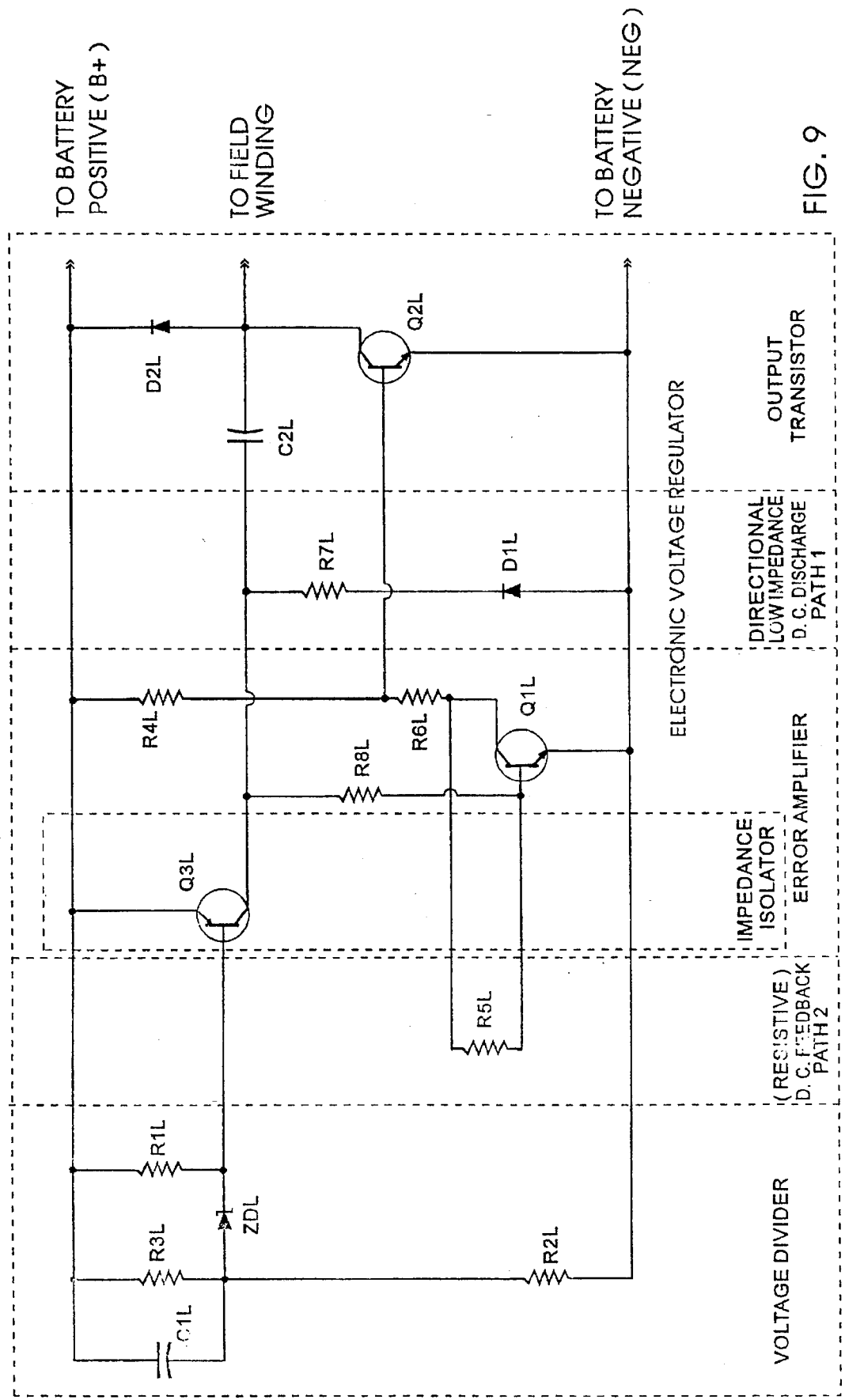
FIG. 9 is an electrical schematic diagram of a preferred seventh embodiment—based on an NPN output transistor and an PNP-NPN transistor pair connected in a double error amplification scheme in the error amplifier stage—of an electronic voltage regulator in accordance with the present invention wherein the regulator incorporates, as well as both the (i) new capacitor located across a leg of the input voltage divider stage of the voltage regulator, and also the (ii) small resistance added in the direct current discharge path to the regulation feedback capacitor, of the present invention, a (iii) (diode) D.C. Discharge path for protection against catastrophic failure due to overload, and also a (resistive) D.C. Feedback path for protection against catastrophic failure due to loss of a reference positive voltage.

Likewise, and similarly, an electrical schematic diagram of a preferred seventh embodiment—based on an NPN output transistor and a PNP-NPN transistor pair connected in a double amplification scheme in the error amplifier stage—of an electronic voltage regulator in accordance with the present invention is shown in FIG. 9. This seventh embodiment of the electronic voltage regulator incorporates, as well as both the (i) new capacitor C1L located across a leg of the input voltage divider stage of the voltage regulator, and also the (ii) small resistance R7L added in the direct current discharge path to the regulation feedback capacitor, of the present invention, a (iii) (diode) D.C. Discharge path for protection against catastrophic failure due to overload, and also a (resistive) D.C. Feedback path for protection against catastrophic failure due to loss of a reference positive voltage.

Figure 10:
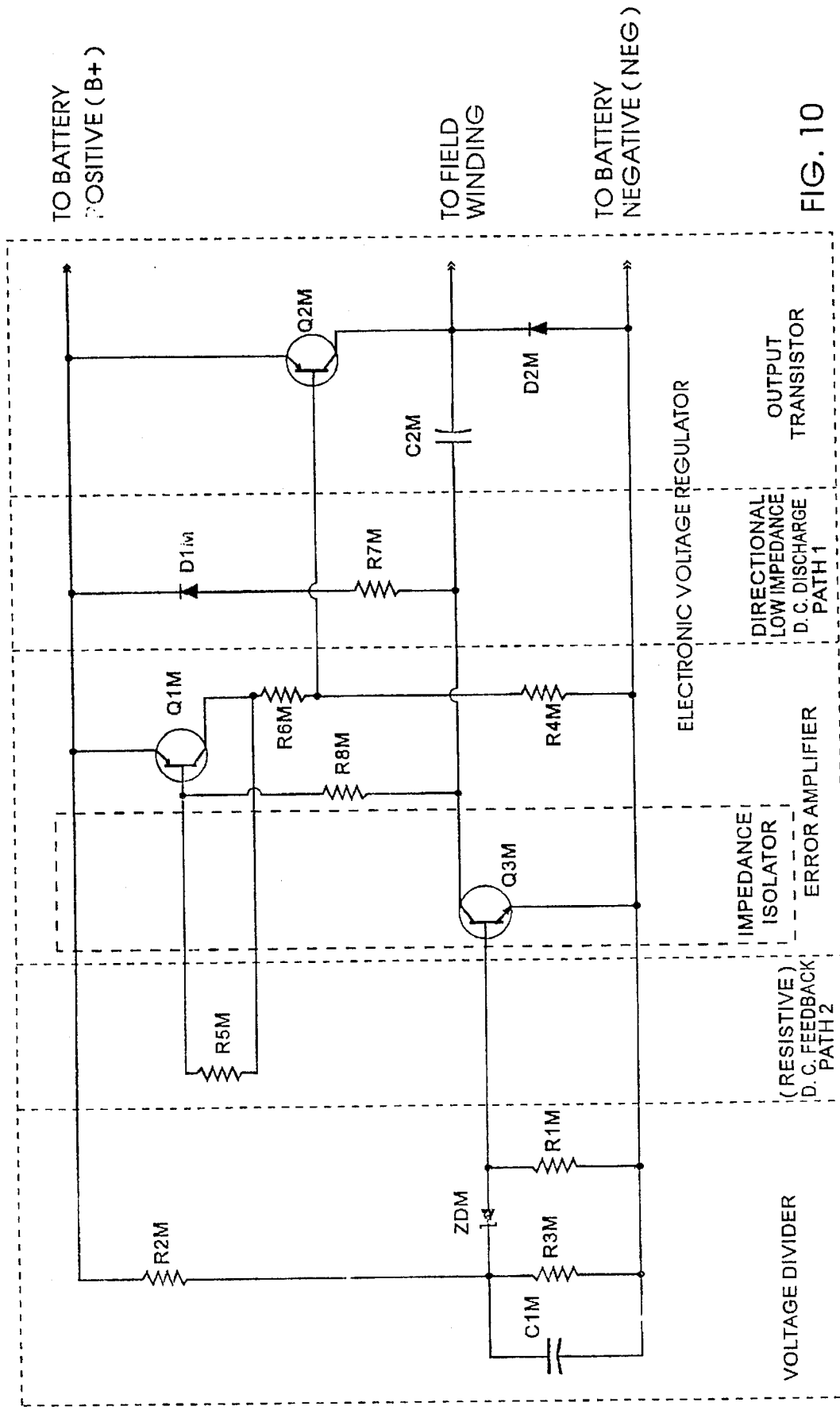
FIG. 10 is an electrical schematic diagram of a preferred eighth embodiment—based on an PNP output transistor and an NPN-PNP transistor pair connected in a double error amplification scheme in the error amplifier stage and complementary to the seventh embodiment shown in FIG. 9—of an electronic voltage regulator in accordance with the present invention wherein the regulator incorporates, as well as both the (i) new capacitor located across a leg of the input voltage divider stage of the voltage regulator, and also the (ii) small resistance added in the direct current discharge path to the regulation feedback capacitor, of the present invention, a (iii) (diode) D.C. Discharge path for protection against catastrophic failure due to overload, and also a (resistive) D.C. Feedback path for protection against catastrophic failure due to loss of a reference negative voltage.

Likewise, and similarly, an electrical schematic diagram of a preferred eighth embodiment—based on a PNP output transistor and an NPN-PNP transistor pair connected in a double amplification scheme in the error amplifier stage—is shown in FIG. 10. The eighth embodiment of FIG. 10 is complementary to the seventh embodiment shown in FIG. 9. This eighth embodiment of an electronic voltage regulator incorporates, as well as both the (i) new capacitor C1M located across a leg of the input voltage divider stage of the voltage regulator, and also the (ii) small resistance R7M added in the direct current discharge path to the represent feedback capacitor, of the present invention, a (iii) (diode) D.C. Discharge path for protection against catastrophic failure due to overload, and also a (resistive) D.C. Feedback path for protection against catastrophic failure due to loss of a reference negative voltage.

Figure 11:
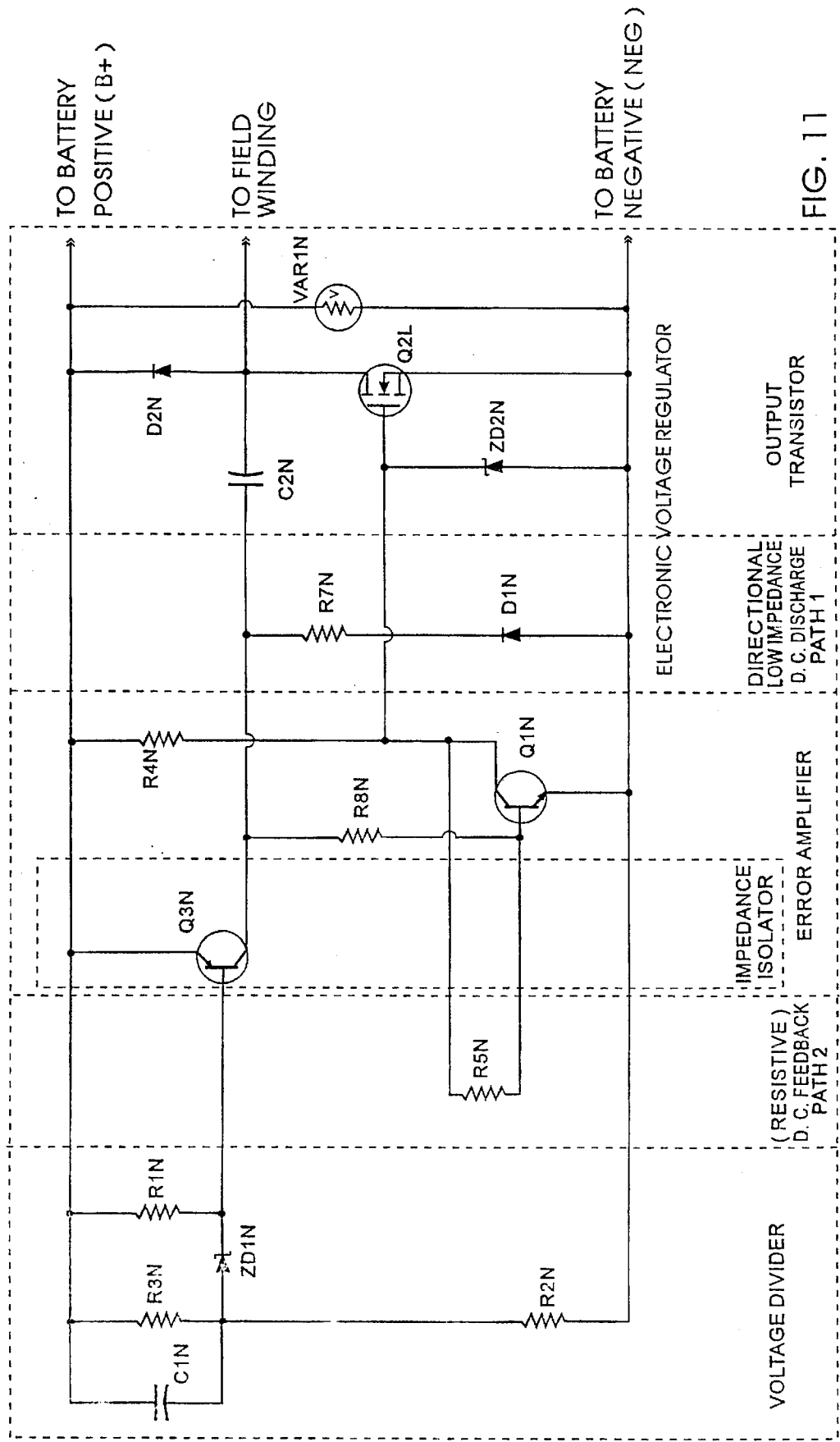
FIG. 11 is an electrical schematic diagram of a preferred ninth embodiment—based on an N-channel power MOS output transistor and an NPN-PNP transistor pair connected in a double error amplification scheme in the error amplifier stage—of an electronic voltage regulator in accordance with the present invention wherein the regulator incorporates, as well as both the (i) new capacitor located across a leg of the input voltage divider stage of the voltage regulator, and also the (ii) small resistance added in the direct current discharge path to the regulation feedback capacitor, of the present invention, a (iii) (diode) D.C. Discharge path for protection against catastrophic failure due to overload, and also a (resistive) D.C. Feedback path for protection against catastrophic failure due to loss of a reference positive voltage.

Finally, an electrical schematic diagram of a preferred ninth embodiment—based on an N-channel power MOS output transistor and an NPN-PNP transistor pair connected in a double amplification scheme in the error amplifier stage—is shown in FIG. 11. This ninth embodiment of an electronic voltage regulator in accordance with the present invention incorporates, as well as both the (i) new capacitor C1N located across a leg of the input voltage divider stage of the voltage regulator, and also the (ii) small resistance R7N added in the direct current discharge path to the regulation feedback capacitor, of the present invention, a (iii) (diode) D.C. Discharge path for protection against catastrophic failure due to overload, and also a (resistive) D.C. Feedback path for protection against catastrophic failure due to loss of a reference positive voltage.

The preferred components, and component values, for all circuit embodiments are given in the following table. All components with an identification ending in "A" are shown within FIG. 1; with an identification ending in "E" within FIG. 2; with an identification ending in "F" within FIG. 3; with an identification ending in "G" are shown within FIG. 4; with an identification ending in "H" within FIG. 5; with an identification ending in "J" within FIG. 7; with an identification ending in "K" within FIG. 8; with an identification ending in "L" within FIG. 9; with an identification ending in "M" within FIG. 10; with a identification ending in "N" within FIG. 11. Not all components appear in all embodiments, and all variants, of the circuits of the present invention.

| COMPONENT | VALUE |
| --- | --- |
| R1 (A) | 470 ohm, ¼ watt adjustable resistor |
| R1 (E, F, G, H, J, K) | 2,700 ohm, ¼ watt adjustable resistor |
| R1 (L, M, N) | 27 kilohm, ¼ watt adjustable resistor |
| R2 (A) | 1,500 ohm, ¼ watt adjustable resistor |
| R2 (E, F, G, H, J, K) | 6,800 ohm, ¼ watt adjustable resistor |
| R2 (L, M, N) | 56 kilohm, ¼ watt adjustable resistor |
| R3 (A) | 560 ohm, ¼ watt carbon film resistor |
| R3 (E, F, G, H) | 120 kilohm, ¼ watt carbon film resistor |
| R3 (J, K) | 30 kilohm, ¼ watt carbon film resistor |
| R3 (L, M, N) | 220 kilohm, ¼ watt carbon film resistor |
| R4 (A, E, F, G, H, J, K, L, M, N) | 1,2000 ohms, ¼ watt carbon film resistor |
| R5 (A) | 220 kilohm, ¼ watt carbon film resistor |
| R5 (E, F, J, K, L, M) | 470 kilohm, ¼ watt carbon film resistor |
| R5 (G, H, N) | 1,200 kilohm, ¼ watt carbon film resistor |
| R6 (A) | 22 ohm, ¼ watt carbon film resistor |
| R6 (E, F, G, H, J, K, L, M) | 18 ohm, ¼ watt carbon film resistor |
| R7 (E, F, G, H, J, K, L, M, N) | 15 to 47 ohms, ¼ watt carbon film resistor |
| R8 (J, K) | 120 kilohm, ¼ watt carbon film resistor |
| R8 (L, M, N) | 47 kilohm, ¼ watt carbon film resistor |
| C1 (A, L, M, N) | .022 microfarad 25 volt (±20%) ceramic capacitor type Y5S or equivalent |
| C1 (E, F, G, H, J, K) | .047 microfarad 25 volt (±20%) ceramic capacitor type Y5S or equivalent |
| C2 (A) | .047 microfarad 25 volt (±20%) ceramic capacitor type Y5S or equivalent |
| C2 (E, F, G, H, J, K, L, M, N) | .022 microfarad 25 volt (±20%) ceramic capacitor type Y5S or equivalent |
| D1 (A, E-N) | silicon diode type 1N4148 or equivalent |
| D2 (A, E, F, G, H) | silicon diode type 1N4148 or equivalent |
| D2 (J, K, L, M, N) | 1 to 3 ampere × 200 volt silicon rectifier |
| D3 (A) | 1 ampere × 200 volt rectifier type 1N4003 or equivalent |
| D3 (E, F, G, H) | 1 to 3 ampere × 200 volt silicon rectifier |
| Q1 (A, E, G, J, M, N) | high gain PNP small signal transistor type PN200A or equivalent |
| Q1 (F, H, K, L) | high gain NPN small signal transistor type PN100A or equivalent |
| Q2 (A, E, G, J, M) | power Darlington PNP transistor type TIP 105 or equivalent (8 amperes × 60 volts) |
| Q2 (F, H, K, L) | power Darlington NPN transistor type TIP 100 or equivalent (8 amperes × 60 volts) |
| Q2 (N) | N-channel power MOS transistor type STP25N06 or equivalent (25 amperes × 60 volts) |
| Q3 (J) | PNP small signal transistor type 2N3906 or equivalent |
| Q3 (K) | NPN small signal transistor type 2N3904 or equivalent |
| Q3 (L) | PNP high gain small signal transistor type PN200A or equivalent |
| Q3 (M, N) | NPN high gain small signal transistor type PN100A or equivalent |
| ZD (A, E, F, G, H, L, M, N) | 10 volt, ½ watt, 5% zener diode type 1N758A or equivalent |

In accordance with the preceding explanation, variations and adaptations of electronic voltage regulators in accordance with the present invention will suggest themselves to a practitioner of the electronic design arts. In particular, the two major circuits of the present invention are separate and severable, and are each applicable to electronic voltage regulators of diverse designs.

In accordance with these and other possible variations and adaptations of the present invention, the scope of the invention should be determined in accordance with the following claims, only, and not solely in accordance with that embodiment within which the invention has been taught.

What is claimed is:

1. An electronic voltage regulator, connected across the voltage terminals of a battery, producing a pulse-width-modulated signal across the field winding of an alternator that is also connected across the voltage terminals of a battery, the voltage regulator comprising:

a diode-isolated voltage divider means, connected across the terminals of the battery, for producing a diode-isolated error voltage that varies in response to variations in a voltage across the terminals of the battery, the diode-isolated voltage divider means being distinguished for including a filter means for filtering electrical noise occurring between the voltage terminals of the battery;

an error amplifier means, connected across the terminals of the battery, for producing an output control signal in response to the diode-isolated error voltage received as an input signal from the voltage divider means, the error amplifier means being distinguished for being without any a.c feedback path directly from the produced output control signal to the input error voltage signal; and a driver means, connected across the terminals of the battery, for producing the pulse-width-modulated signal in response to the control signal received from the error amplifier means via a direct current path;

wherein a normal function of the absent feedback path between the output control signal and the input error voltage signal of the amplifier means to stabilize the error amplifier means, and thus the pulse-width-modulated signal output of the voltage regulator, is instead performed by the filter means of the diode-isolated voltage divider means.

2. The electronic voltage regulator according to claim 1 wherein the diode-isolated voltage divider means comprises in an electrical path between the two voltage terminals of the battery:

a first resistor;

a diode connected in electrical series with the first resistor;

a capacitor connected in electrical parallel with the electrically-series-connected first resistor and diode, jointly; and a second resistor connected in electrical series with the collective (i) electrically-series-connected first resistor and diode that are jointly electrically-parallel-connected with (ii) the capacitor;

wherein the error voltage is developed at the junction of the first resistor and the diode, thus making that a voltage divider is realized from, as a first voltage divider leg, the first resistor and, as a second voltage divider leg, the diode and the second resistor;

wherein the capacitor so connected acts as the filter means to filter electrical noise between the terminals of the battery.

3. The electronic voltage regulator according to claim 1 wherein the diode comprises:

a zener diode.

4. The electronic voltage regulator according to claim 1 further comprising:

an a.c. feedback means for feeding back the pulse-width-modulated signal in a feedback path from the driver means to the error amplifier means.

5. An electronic voltage regulator, connected across the voltage terminals of a battery, producing a pulse-width-modulated signal across the field winding of an alternator that is also connected across the voltage terminals of a battery, the voltage regulator comprising:

a diode-isolated voltage divider means, connected across the terminals of the battery, for producing a diode-isolated error voltage that varies in response to variations in a voltage across the terminals of the battery, the diode-isolated voltage divider means being distinguished for including a filter means for filtering electrical noise occurring between the voltage terminals of the battery;

an error amplifier means, connected across the terminals of the battery, for producing an output control signal in response to the diode-isolated error voltage received as an input signal from the voltage divider means;

a driver means, connected across the terminals of the battery, for producing the pulse-width-modulated signal in response to the control signal received from the error amplifier means via a direct current path;

an a.c. feedback means for feeding back the pulse-width-modulated signal in a feedback path from the driver means to the error amplifier means.

6. The electronic voltage regulator according to claim 5 wherein the diode-isolated voltage divider means comprises in an electrical path between the two voltage terminals of the battery:

a first resistor;

a diode connected in electrical series with the first resistor;

a capacitor connected in electrical parallel with the electrically-series-connected first resistor and diode, jointly; and a second resistor connected in electrical series with the collective (i) electrically-series-connected first resistor and diode that are jointly electrically-parallel-connected with (ii) the capacitor;

wherein the error voltage is developed at the junction of the first resistor and the diode, thus making that a voltage divider is realized from, as a first voltage divider leg, the first resistor and, as a second voltage divider leg, the diode and the second resistor;

wherein the capacitor so connected acts as the filter means to filter electrical noise between the terminals of the battery.

7. The electronic voltage regulator according to claim 6 wherein the diode comprises:

a zener diode.

8. The electronic voltage regulator according to claim 4 wherein the error amplifier means is without any a.c feedback path directly from the produced output control signal to the input error voltage signal.

9. A method of voltage regulation for producing in an electronic voltage regulator connected across voltage terminals of a battery a pulse-width-modulated signal that is applied across a field winding of an alternator that is also connected across the voltage terminals of the battery, the voltage regulator method comprising:

first producing in a diode-isolated voltage divider means that is connected across the voltage terminals of the battery a diode-isolated error voltage that varies in response to variations in a voltage across the terminals of the battery;

filtering in a filter electrical noise occurring between the voltage terminals of the battery, and thus electrical noise occurring in the diode-isolated error voltage;

second producing in an error amplifier that is connected across the terminals of the battery an output control signal in response to the diode-isolated error voltage, the second producing transpiring without any a.c feedback path directly from the second-produced output control signal to the input error voltage signal; and third producing in a driver that is connected across the terminals of the battery the pulse-width-modulated signal in response to the second-produced output control signal received from the error amplifier means via a direct current path; and therein stabilizing the error amplifier, and thus the third-produced pulse-width-modulated signal output of the voltage regulator, by act of the filtering instead of by any a.c. feed back of any of the output control signal to the input error voltage signal of the amplifier.

10. In an electronic voltage regulator that produces a pulse-width-modulated signal across the field winding of an alternator, the voltage regulator being connected across a battery that develops a voltage between a positive terminal and a negative terminal, the voltage regulator having an error amplifier means, having a signal input port and a signal output port, for selectively conducting responsive to variations in the voltage of the battery so as to produce a control signal, the error amplifier means connected by a direct current path from its signal output port to an output driver means that is responsive to the control signal for selectively conducting so as to produce at its output port the pulse-width-modulated signal, a capacitor means for feeding back alternating current in a feedback path from the output port of the output driver means to the signal input port of the error amplifier means, and a diode means connecting the capacitor means to one of the voltage terminals of the battery in a sense that provides a direct current path for discharging the capacitor means when the output driver means is conducting, the diode means acting upon any such times as the output driver means attempts to drive the pulse-width-modulated signal into any such abnormally low impedance as causes the current in the output driver means to both rise precipitously and to be fed back through the capacitor means, to timely discharge this capacitor means sufficiently fast enough, in comparison to a response time of the error amplifier means, so as to drive the output driver means to a non-conducting state before it sustains damage;

an improvement to the diode means directed to permitting the output driver means to, incipiently and momentarily upon beginning conduction, conduct current of such a high amount, and at such rapidity, from both the battery and the capacitor means, jointly, as does effectively become momentarily indistinguishable from the current that would be conducted should the field winding at the output port of the driver means exhibit such an abnormally low impedance as would, by action of the capacitor means, cause the output driver means to be driven non-conducting, the improvement to the diode means that permits the momentary conduction of high current from the driver means comprising:

a diode connecting the capacitor means to one of the voltage terminals of the battery in a sense that provides a direct current path for discharging the capacitor means when the output driver means is conducting; and a resistance in electrical series with the diode.

11. To a voltage regulation method performed in an electronic voltage regulator, connected across a battery that develops a voltage between a positive terminal and a negative terminal, that is producing a pulse-width-modulated signal across the field winding of an alternator, the voltage regulation method including selectively amplifying in an error amplifier variations in the voltage of the battery appearing at an input port so as to produce a control signal at an signal output port, selectively producing in an output driver, responsively to the control signal received via a direct current path from the error amplifier, the pulse-width-modulated signal at an output port, feeding back in a capacitor alternating current from the output port of the output driver to the signal input port of the error amplifier means, and electrically diode-connecting the capacitor to one of the voltage terminals of the battery in a sense that provides a direct current path for discharging the capacitor means when the output driver means is conducting, the diode-connecting acting, upon any such times as the output driver means attempts to drive the pulse-width-modulated signal into any such abnormally low impedance as causes the current in the output driver means to rise precipitously and to be fed back through the capacitor means, to timely discharge this capacitor means sufficiently fast enough, in comparison to a response time of the error amplifier means, so as to drive the output driver means to a non-conducting state before it sustains damage, an improvement to the diode-connecting directed to permitting the output driver means to, incipiently and momentarily upon beginning conduction, conduct current of such a high amount, and at such rapidity, from both the battery and the capacitor means, jointly, as does effectively become momentarily indistinguishable from the current that would be conducted should the field winding at the output port of the driver means exhibit such an abnormally low impedance as would, by action of the capacitor means, cause the output driver means to be driven non-conducting, the improvement to the diode-connecting so as to permit the momentary conduction of high current from the driver means comprising:

diode-connecting the capacitor to one of the voltage terminals of the battery in a sense that provides a direct current path for discharging the capacitor when the output driver is conducting; and inserting a resistance in electrical series with the diode.

\* \* \* \* \*